United States Patent [19]

Abe

[11] Patent Number: 5,757,993

[45] Date of Patent: May 26, 1998

[54] METHOD AND OPTICAL SYSTEM FOR PASSING LIGHT BETWEEN AN OPTICAL FIBER AND GRIN LENS

[75] Inventor: Koichi Abe, Ottawa, Canada

[73] Assignee: JDS Fitel Inc., Nepean, Canada

[21] Appl. No.: 767,433

[22] Filed: Dec. 16, 1996

Related U.S. Application Data

[63] Continuation of Ser. No. 462,149, Jun. 5, 1995, abandoned.

[51] Int. Cl.⁶ .................................................. G02B 6/32
[52] U.S. Cl. .................................................. 385/34
[58] Field of Search ........................... 385/31–36, 39, 385/41

[56] References Cited

U.S. PATENT DOCUMENTS

| | | | |
|---|---|---|---|
| 4,257,672 | 3/1981 | Balliet | 385/35 |
| 4,763,976 | 8/1988 | Nolan et al. | 385/43 |
| 4,877,300 | 10/1989 | Newhouse et al. | 385/43 |
| 5,066,089 | 11/1991 | Greil et al. | 385/35 |
| 5,071,212 | 12/1991 | Mesaki et al. | 385/11 |
| 5,129,021 | 7/1992 | Mortimore et al. | 385/46 |
| 5,301,252 | 4/1994 | Yanagawa et al. | 385/96 |
| 5,351,323 | 9/1994 | Miller et al. | 385/28 |
| 5,357,590 | 10/1994 | Auracher | 385/35 X |
| 5,377,287 | 12/1994 | Lee et al. | 385/35 |
| 5,446,820 | 8/1995 | Ishikawa et al. | 385/123 |
| 5,459,802 | 10/1995 | Kyouya et al. | 385/35 X |
| 5,564,285 | 10/1996 | Jurewicz et al. | 374/186 |
| 5,572,618 | 11/1996 | DiGiovanni et al. | 385/140 |
| 5,594,825 | 1/1997 | Kawasaki et al. | 385/60 |

*Primary Examiner*—Akm E. Ullah
*Attorney, Agent, or Firm*—Neil Teitelbaum & Associates

[57] ABSTRACT

A method and optical system are provided which lessen spherical aberration normally associated with coupling small-diameter core optical fiber with a collimating lens. By coupling and optically aligned ends of thermally expanded core (TEC) fiber having a small output angular divergence to a GRIN lens, spherical aberration is significantly reduced.

8 Claims, 3 Drawing Sheets

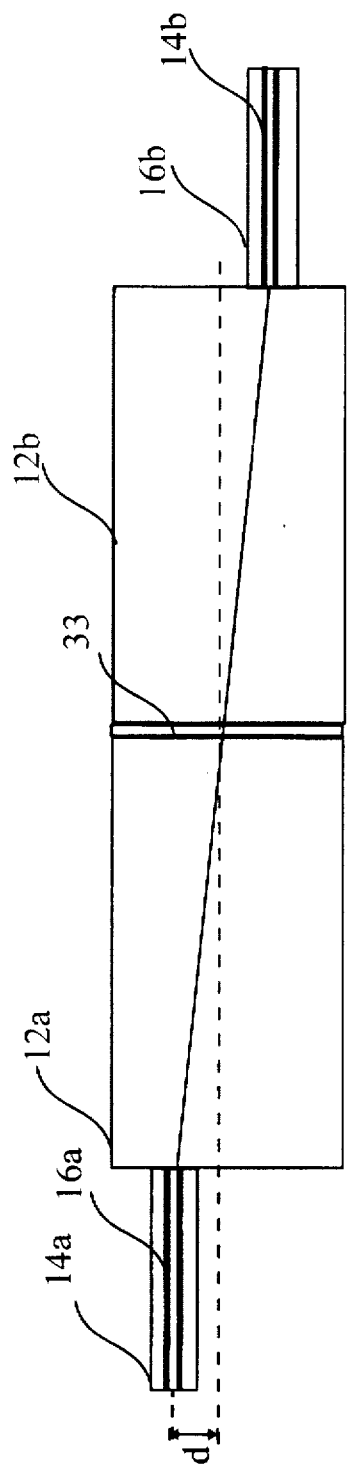

METHOD AND OPTICAL SYSTEM FOR PASSING LIGHT BETWEEN AN OPTICAL FIBER AND GRIN LENS

This application is a continuation of application Ser. No. 08/462,149, filed on Jun. 5, 1995, now abandoned.

FIELD OF THE INVENTION

This invention relates to efficiently coupling an optical fiber to a graded index (GRIN) lens, and more particularly, to a method and optical system for lessening unwanted spherical aberration in a GRIN lens resulting from coupling a small-diameter waveguide thereto.

BACKGROUND OF THE INVENTION

A beam expanding fiber is disclosed in a reference entitled "Beam Expanding Fiber Using Thermal Diffusion of the Dopant" in Journal of Lightwave Technology, Vol. 8, No. 8 August 1990. The beam expanding fiber of the above reference has a core whose index of refraction is determined by the dopant e.g., Ge, that is thermally diffused so that a spot size of the fundamental mode, which corresponds to "mode-field diameter of the optical fiber", is expanded towards the end of the fiber. This is sometimes referred to as "expanding core fiber". However since the core diameter of the fiber is not always precisely measureable, due to diffusion effects, reference is usually made to the "mode field diameter" or "MFD", and this type of fiber is referred to as "expanded MFD" fiber.

It is known that by increasing the mode field diameter at the end of the optical fiber as shown in the above reference, it is possible to insert a lensless optical device between the fibers with the expanded mode fields without significant loss increase. Furthermore, mode field expanded fiber is becoming of interest and useful for matching two dissimilar optical fibers.

One of the more ubiquitous building blocks used in the design and manufacture of optical elements is the GRIN lens. Lenses of this type are produced under the trade name "SELFOC"; the mark is registered in Japan and owned by the Nippon Sheet and Glass Co. Ltd. GRIN lenses in combination with other optical elements are used in the manufacture of WDM devices, optical couplers, circulators, isolators, and other devices.

Recently there have been requirements to use optical fibers having a small core diameter of approximately 4 μm or less with lensed optical devices, particularly GRIN lenses. An impetus utilizing a small core diameter optical fiber having a small mode field, is a high power density that is desirable for pumping rare earth, (i.e. erbium) doped amplifying optical fiber. However, a larger numerical aperture (NA) is required as consequence of designing an optical waveguide that includes a smaller core diameter optical fiber that is single-mode at a given operational wavelength. Numerical aperture is inversely proportional to the core diameter. A consequence of a larger NA is a larger angular divergence of an output beam exiting the end-face of the small core diameter optical fiber. Furthermore, coupling a small core optical fiber (of diameter 4 μm or less) having a large NA (of 0.2 or greater) to a GRIN lens is also known to result in spherical aberration in the lens. As the NA of an optical fiber coupled to a GRIN lens changes, so does the beam profile within the GRIN lens; the beam diameter is directly proportional to the numerical aperture. Unfortunately, as the beam diameter within a GRIN lens increases, so does the spherical aberration due to the lens.

It is therefore an object of the invention to provide a means of coupling a small-diameter-core optical fiber to a GRIN lens, lessening spherical aberration normally associated with coupling small-diameter-core (hence large NA,) optical fiber to such a lens.

It is a further object of the invention to provide a method of coupling a pair of small-diameter-core optical fibers to a GRIN lens in a manner such that spherical aberrations due to the lens are minimized.

SUMMARY OF THE INVENTION

In a first aspect, the combination of coupling one or more GRIN lenses with one or more expanded core optical fibers lessens spherical aberrations normally associated with coupling small-diameter-core single-mode optical fiber to a GRIN lens.

In accordance with the invention there is provided an optical arrangement for lessening spherical aberration comprising: a GRIN lens having two end-faces; a first optical fiber having a core at least a portion of which has an expanding diameter along its longitudinal axis, an end-face of the first optical fiber having a substantially larger core diameter than other portions of the fiber, said end-face being optically coupled to an end-face of the GRIN lens.

In accordance with another aspect of the invention there is provided a method for reducing spherical aberration comprising the steps of: providing a GRIN lens system; providing at least two optical fibers each having an end with an expanded core, each of the ends having approximately the same diameters, and coupling the expanded core ends to the GRIN lens system.

In accordance with the invention there is further provided an optical arrangement for lessening spherical aberration due to a collimating lens. The arrangement comprises a first GRIN lens having two end-faces; a second GRIN lens having two end-faces; an optical element disposed between inwardly facing end-faces of the first and second GRIN lenses; a first optical fiber having a core at least a portion of which has an expanding diameter along its longitudinal axis, an end-face of the first optical fiber having a substantially larger core diameter than other portions of the fiber, said end-face being optically coupled to an outwardly facing end-face of the first GRIN lens; and, a second optical fiber having a core with at least an end portion with a diameter approximately equal to the substantially larger diameter at the end-face of the first optical fiber, said end-face of the second optical fiber being optically coupled to an outwardly facing end-face of the second GRIN lens, whereby the first optical fiber and the second optical fiber are coupled at locations on respective end-faces of the GRIN lenses such that they are optically aligned.

BRIEF DESCRIPTION OF THE DRAWINGS

Exemplary embodiments of the invention will now be described in conjunction with the drawings, in which.

DETAILED DESCRIPTION

As was mentioned heretofore, when an optical fiber having a small mode field (for example of 4 µm or less) and hence a large numerical aperture (0.2 or greater) is coupled to a GRIN lens, the diameter of a beam of light collimated by the GRIN lens may become too large for light to be efficiently coupled via the lens. In effect when the diameter of the mode field of a single-mode optical fiber decreases, the angular divergence of the output field increases and the diameter of the collimated beam in the lens increases. When this increase becomes significant, spherical aberration in the lens occurs due to the imperfection of the index profile towards the outer periphery.

To resolve the aforementioned problems of the prior art, the inventors of the present invention have paid attention to a core-expanded fiber which may be produced by locally diffusing dopant contained in a core member using the TEC (thermally expanded core) technique, and has been used for an optical fiber integrated structure having optical functional elements directly coupled with optical fibers.

Figure 1:
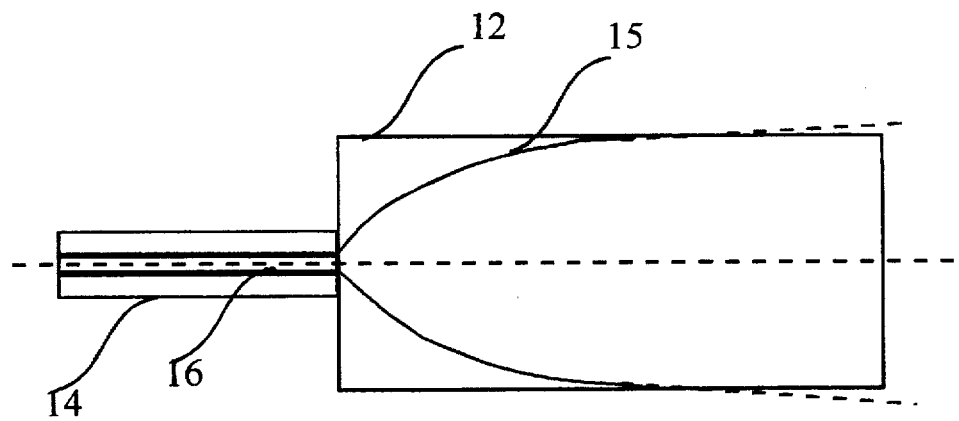
FIG. 1 is a side view of an optical fiber coupled to a GRIN lens as is known in the prior art.

Turning now to FIG. 1, a small-diameter-core 16 optical fiber 14 is shown coupled to a GRIN lens 12. The core or mode field of the optical fiber 14 has an constant diameter of 4 µm or less. The NA at the end-face of the optical fiber 14 is 0.2 or larger. The beam profile 15 is actually expanding in such a manner as to allow light to leave the lens via the side-wall.

Figure 2:
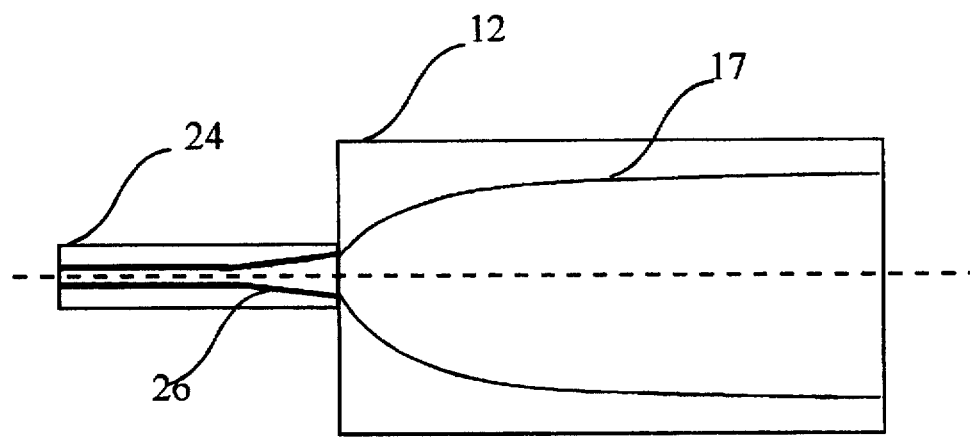
FIG. 2 is a side view of an expanded core optical fiber coupled to a GRIN lens in accordance with this invention.
Figure 3:
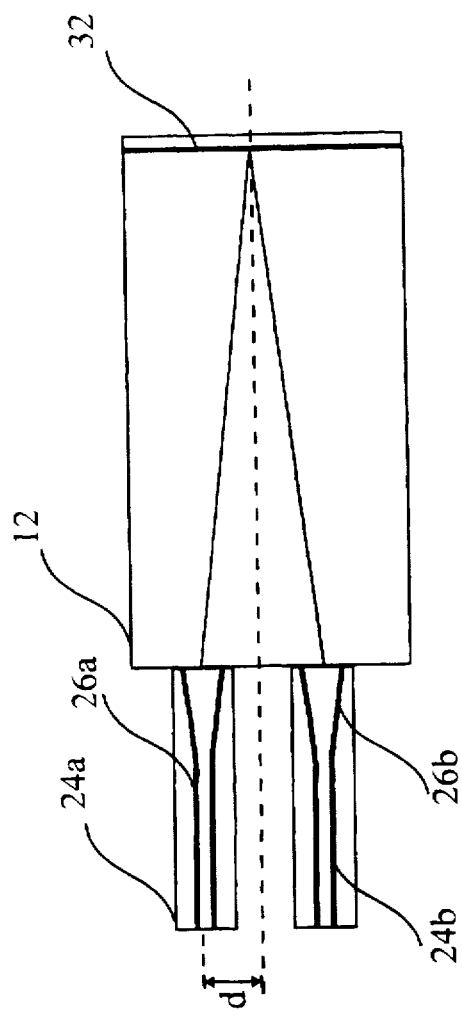
FIG. 3 is a side view alternative embodiment to that of FIG. 2 having a single-mode fiber and an expanded core optical fiber optically aligned along a path including a wideband reflective wavelength dependent optical element.
Figure 4:
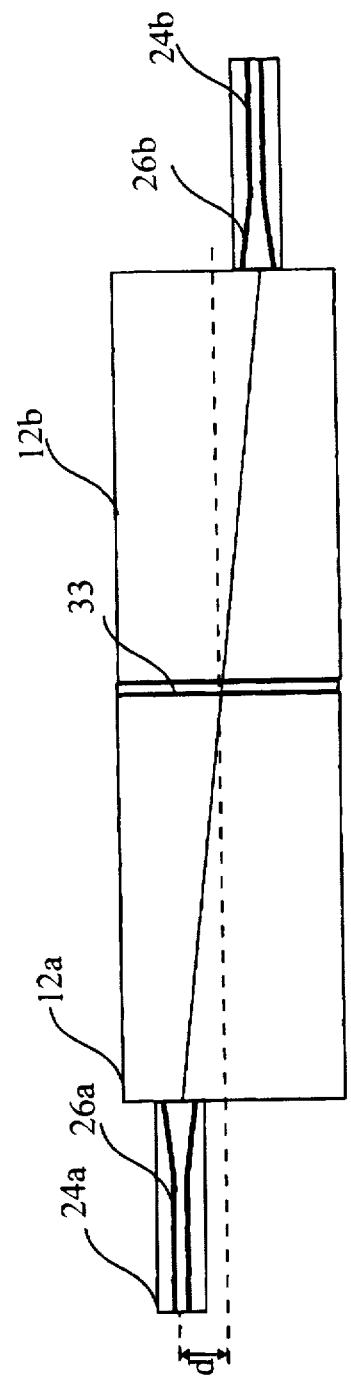
FIG. 4 is a side view of an optical system having a pair of GRIN lenses having expanded core fiber ends on opposite sides of an optical axis at outwardly facing ends of the lenses; and, FIG. 5 is a side view of an optical system in accordance with the prior art.

Referring now to FIG. 2, an optical fiber 24 having a TEC 26 at one end is shown. The fiber 24 is coupled to a quarter pitch GRIN lens 12 similar to that of FIG. 1. The beam profile 17 is not only confined within the maximum NA of the lens but also has less spherical aberration than the beam profile 15 due to the use of the lens only at the centre portion where the refractive index profile is well controlled. Substantially the entire length of the optical fiber 24, with the exception of an end portion 26 has a mode field diameter (MFD) of 4 µm or less; the end portion has a thermally expanded core 26 with an MFD of more than 6 µm and preferably about 10 µm. The expanding end portion 26 is about 5 mm in length. Referring now to FIGS. 3 and 4, two optical arrangements are shown, each of which has two optically aligned TEC optical fibers 24a and 24b connected to a first end of the lens 12, the other end of which lens carries a wideband reflective dependent optical element 32, specifically a partially reflective coating. Surprisingly, by combining expanded core fibers with one or more GRIN lenses, two distinct advantages succeed. Firstly, small-diameter-core optical fiber having an expanded core end can be utilized or coupled with a GRIN lens to significantly reduce spherical aberration normally associated with coupling small-diameter-core optical fiber with a collimating lens; and, secondly, less precision is required in optically aligning the small-diameter-core optical fiber, since the end coupled with the GRIN lens is larger and the fiber to fiber coupling efficiency will be less sensitive to small misalignment. This is illustrated further by viewing FIGS. 4 and 5. In prior art FIG. 5, two, small-diameter-core optical fibers 14a and 14b are disposed on opposite sides of a common optical axis of two identical back-to-back GRIN lenses 12a and 12b having inwardly facing end faces between which is disposed an optical element 33. The optical fibers are optically aligned to couple a maximum amount of light when they are precisely offset by a same distance from the optical axis. However, achieving this with small-diameter-core optical fiber is very difficult. In FIG. 4 a similar arrangement is shown, however, the cores 26a and 26b of the optical fibers 24a and 24b respectively are expanded at ends coupled to a pair of back-to-back GRIN lenses 12a and 12b. In this arrangement, the allowable tolerance, or margin of error in alignment of the optical fiber ends to a GRIN lens is substantially greater. The larger diameter core ends essentially provide a larger target into which the light is coupled. Substantially aligning ends that are 10 µm or more in diameter is far less critical than aligning ends that are 4 µm or less in diameter. If the error in alignment in the latter case is larger than 4 µm, essentially no light will be coupled, where if the error in aligning the 10 µm ends is approximately equal to 4 µm, approximately half the transmitted light will be coupled. Furthermore, and more importantly, by enlarging the core end face and by reducing the angular divergence of the exiting beam at the fiber end, coupling loss due to spherical aberration is lessened.

To more efficiently couple light from one fiber to another, it is preferred to match the mode field. For example, in FIG. 4 the fibers 24a and 24b have typical core diameters of less than 4 µm and have matching expanded end faces of approximately 10 µm.

Of course numerous other embodiments may be envisaged without departing from the spirit and scope of the invention.

What I claim is:

1. An optical arrangement for minimizing spherical aberration when passing light between an optical fiber and a GRIN lens comprising:

a first GRIN lens having first and second end-faces;

a first single mode optical fiber at least a portion of which has an expanding mode field diameter along its longitudinal axis such that a first end-face of the first optical fiber has a substantially larger mode field diameter than other portions of the fiber for confinement of a beam emitting from the first end-face of the first single mode optical fiber within a maximum numerical aperture of the first GRIN lens and reduction of spherical aberration of the profile of the beam, said first end-face being directly optically coupled to a first end-face of the GRIN lens.

2. An optical arrangement as defined in claim 1, further comprising a second optical fiber having a second end-face with a mode field diameter approximately equal to the substantially larger mode field diameter, said second end-face being coupled to said first end-face of the GRIN lens and being optically aligned with the first optical fiber, and wherein the second end-face of the first GRIN lens is coated with an at least partially reflective coating.

3. An optical arrangement as defined in claim 1, wherein said other portions of the first optical fiber have a mode field diameter of substantially 4 µm or less and wherein the first end-face has a mode field diameter of 6 µm or more.

4. An optical arrangement for minimizing spherical aberration when passing light between an optical fiber and a collimating GRIN lens comprising:

a first GRIN lens having two end-faces;

a second GRIN lens having two end-faces;

an optical element disposed between inwardly facing end-faces of the first and second GRIN lenses;

a first single mode optical fiber at least a portion of which has an expanding mode field diameter along its longitudinal axis and such that an end-face of the first optical fiber has a substantially larger mode field diameter than other portions of the core for confinement of a beam emitting from the end-face of the first single mode optical fiber within a maximum numerical aperture of the first GRIN lens and reduction of spherical aberration of the profile of the beam, said end-face being directly optically coupled to an outwardly facing end-face of the first GRIN lens; and, a second optical fiber having at least an end portion with an expanding mode field diameter at its end-face approximately equal to the expanding mode field diameter at the end-face of the first optical fiber for confinement of a beam emitting from the end portion of the second optical fiber within a maximum numerical aperture of the second GRIN lens and reduction of spherical aberration of the profile of the beam, said end-face of the second optical fiber being directly optically coupled to an outwardly facing end-face of the second GRIN lens, the first optical fiber and the second optical fiber being directly optically coupled at locations on respective end-faces of the GRIN lenses such that they are optically aligned.

5. An optical arrangement for minimizing spherical aberration in a collimating lens as defined in claim 4, wherein the second optical fiber is a single mode fiber and has a core at least a portion of which has an expanding diameter along its longitudinal axis, said end-face of the second optical fiber having a substantially larger mode field diameter than portions of the fiber remote from its said end face.

6. An optical arrangement as defined in claim 5, wherein said end faces of the first and second optical fibers are coupled to respective GRIN lenses on opposite sides of a common optical axis of the GRIN lenses.

7. An optical arrangement as defined in claim 4 wherein said end-faces of the first and second optical fibers have a mode field diameter substantially between or equal to 6 to 10 µm.

8. An optical arrangement for lessening spherical aberration in a GRIN lens comprising:

a first GRIN lens having two end-faces;

a first optical fiber at least a portion of which has an expanding mode field diameter along its longitudinal axis, an end-face of the first optical fiber having a substantially larger mode field diameter than other portions of the fiber for confinement of a beam emitting from the end-face of the first optical fiber within a maximum numerical aperture of the first GRIN lens and reduction of spherical aberration of the profile of the beam, said end-face being directly optically coupled to an end-face of the GRIN lens.

* * * * *